United States Patent [19]

Hasegawa

[11] Patent Number: 5,031,093
[45] Date of Patent: Jul. 9, 1991

[54] SYSTEM FOR ESTABLISHING ROUTE BY SELECTING MINIMUM OF TIME-INDEPENDENT LINK PARAMETERS OF INCREMENTAL VALUES

[75] Inventor: Satoshi Hasegawa, Tokyo, Japan

[73] Assignee: NEC Corporation, Tokyo, Japan

[21] Appl. No.: 500,114

[22] Filed: Mar. 27, 1990

Related U.S. Application Data

[63] Continuation of Ser. No. 136,369, Dec. 22, 1987, abandoned.

[30] Foreign Application Priority Data

Dec. 22, 1986 [JP] Japan .................. 61-307040
Dec. 22, 1986 [JP] Japan .................. 61-307041

[51] Int. Cl.$^5$ .............................................. G06F 15/00
[52] U.S. Cl. .................. 364/200; 364/222.2; 364/284.3; 364/284.4; 364/514; 370/16; 370/17
[58] Field of Search ... 360/200 MS File, 900 MS File, 360/51; 370/16, 17, 60, 85.7, 94.2; 340/825.52

[56] References Cited

U.S. PATENT DOCUMENTS

| | | | |
|---|---|---|---|
| 4,466,060 | 8/1984 | Riddle | 364/200 |
| 4,656,658 | 4/1987 | King | 379/221 |
| 4,736,363 | 4/1988 | Aubin et al. | 370/60 |
| 4,742,511 | 5/1988 | Johnson | 370/94 |
| 4,748,660 | 5/1988 | Deveze | 364/514 X |
| 4,771,424 | 9/1988 | Suzuki et al. | 370/86 |

OTHER PUBLICATIONS

Cantor et al, "Optimal Routing in a Packet-Switched Computer Network", IEEE Tran. Computer, vol. C-23, No. 10, Oct. 1974, pp. 1062-1069.
McQuillan et al, "The New Routing Algorithm for the ARPANET", IEEE Tran. Communication, vol. COM-28, No. 5, May 1980, pp. 711-719.
Bertsekas, "Dynamic Behavior of Shortest Path Routing Algorithms for Communication Networks", IEEE Tran. Automatic Control, Feb. 1982, pp. 60-74.
Gallager, "A Minimum Delay Routing Algorithm Using Distributed Computation", IEEE Tran. Communication, Jan. 1977, pp. 73-85.
Niznik et al, "A Gateway Dynamic Congestion Table Algorithm for Computer Internetworks", IEEE Comput. Soc. Press, pp. 99-108, 1985.
"Data and Computer Communications", William Stallings, ph.D, pp. 258-260.
"Computer Networks" by Andrew S. Tanenbaum, pp. 38-40.

*Primary Examiner*—Thomas C. Lee
*Attorney, Agent, or Firm*—Foley & Lardner

[57] ABSTRACT

A routing matrix for fixed routing is derived for a communications network having a plurality of nodes interconnected by links each having a link parameter. A second node which can be reached from a first node by a single hop is determined, and a third node which can be reached from the second node by (m−1) hops is determined, where m is an integer equal to or greater than unity. A route between the first and third nodes via the second node is selected if this route is the only route available therebetween. A route which minimizes a total of link parameters between the first and third nodes is selected if two or more routes are available between the first and third nodes. The identification of the second node of the selected route is stored in a location of a routing directory which can be addressed in response to the identifications of the first and third nodes. The above steps are repeated by shifting the first node to the next and incrementing the value m by one.

3 Claims, 9 Drawing Sheets

INITIAL LINK WEIGHT MATRIX

TO NODE

FROM NODE

|   | 1 | 2 | 3 | 4 | 5 |
|---|---|---|---|---|---|
| 1 | 0 | 1 | 0 | 1 | 0 |
| 2 | 1 | 0 | 1 | 1 | 1 |
| 3 | 0 | 1 | 0 | 0 | 1 |
| 4 | 1 | 1 | 0 | 0 | 1 |
| 5 | 0 | 1 | 1 | 1 | 0 |

FIG.3b

LINK WEIGHT MATRIX

TO NODE

FROM NODE

|   | 1 | 2 | 3 | 4 | 5 |
|---|---|---|---|---|---|
| 1 | 0 | 1.1 | 0 | 1.1 | 0 |
| 2 | 1.1 | 0 | 1.1 | 1.1 | 1.1 |
| 3 | 0 | 1.1 | 0 | 0 | 1.1 |
| 4 | 1.1 | 1.1 | 0 | 0 | 1.1 |
| 5 | 0 | 1.1 | 1.1 | 1.1 | 0 |

FIG.3c

LINK WEIGHT MATRIX

TO NODE

FROM NODE

|   | 1 | 2 | 3 | 4 | 5 |
|---|---|---|---|---|---|
| 1 | 0 | 1.2 | 0 | 1.1 | 0 |
| 2 | 1.2 | 0 | 1.2 | 1.1 | 1.1 |
| 3 | 0 | 1.2 | 0 | 0 | 1.1 |
| 4 | 1.1 | 1.1 | 0 | 0 | 1.1 |
| 5 | 0 | 1.1 | 1.1 | 1.1 | 0 |

FIG.4a

ROUTING MATRIX $$\begin{array}{c} \\ \text{FROM} \\ \text{NODE} \end{array} \begin{array}{c} \\ 1 \\ 2 \\ 3 \\ 4 \\ 5 \end{array} \begin{array}{c} \text{TO NODE} \\ \begin{array}{ccccc} 1 & 2 & 3 & 4 & 5 \end{array} \\ \left[ \begin{array}{ccccc} 1 & 2 & \infty & 4 & \infty \\ 1 & 2 & 3 & 4 & 5 \\ \infty & 2 & 3 & \infty & 5 \\ 1 & 2 & \infty & 4 & 5 \\ \infty & 2 & 3 & 4 & 5 \end{array} \right] \end{array}$$

FIG.4b

ROUTING MATRIX $$\begin{array}{c} \\ \text{FROM} \\ \text{NODE} \end{array} \begin{array}{c} \\ 1 \\ 2 \\ 3 \\ 4 \\ 5 \end{array} \begin{array}{c} \text{TO NODE} \\ \begin{array}{ccccc} 1 & 2 & 3 & 4 & 5 \end{array} \\ \left[ \begin{array}{ccccc} 1 & 2 & 2 & 4 & 4 \\ 1 & 2 & 3 & 4 & 5 \\ 2 & 2 & 3 & 5 & 5 \\ 1 & 2 & 5 & 4 & 5 \\ 4 & 2 & 3 & 4 & 5 \end{array} \right] \end{array}$$

FIG.5a

DISTANCE MATRIX

TO NODE $$\text{FROM NODE} \begin{array}{c} \\ 1 \\ 2 \\ 3 \\ 4 \\ 5 \end{array} \begin{array}{ccccc} 1 & 2 & 3 & 4 & 5 \\ \left[\begin{array}{ccccc} 0 & 1 & 2 & 1 & 2 \\ 1 & 0 & 1 & 1 & 1 \\ 2 & 1 & 0 & 2 & 1 \\ 1 & 1 & 2 & 0 & 1 \\ 2 & 1 & 1 & 1 & 0 \end{array}\right] \end{array} \quad (m=2)$$

FIG.5b

DISTANCE MATRIX

TO NODE $$\text{FROM NODE} \begin{array}{c} \\ 1 \\ 2 \\ 3 \\ 4 \\ 5 \end{array} \begin{array}{ccccc} 1 & 2 & 3 & 4 & 5 \\ \left[\begin{array}{ccccc} 0 & 1 & \infty & 1 & \infty \\ 1 & 0 & 1 & 1 & 1 \\ \infty & 1 & 0 & \infty & 1 \\ 1 & 1 & \infty & 0 & 1 \\ \infty & 1 & 1 & 1 & 0 \end{array}\right] \end{array} \quad (m=1)$$

FIG.6a

FIG.6b
PRIOR ART ROUTING MATRIX

TO NODE

|  | | 6 | 7 | 8 | 9 | 10 | 11 | 12 | 13 | 14 |
|---|---|---|---|---|---|---|---|---|---|---|
| FROM NODE | 6 | 6 | 7 | 7 | 9 | 7 | 7 | 9 | 7 | 7 |
| | 7 | 6 | 7 | 8 | 6 | 10 | 8 | 6 | 10 | 8 |
| | 8 | 7 | 7 | 8 | 7 | 7 | 11 | 7 | 7 | 11 |
| | 9 | 6 | 6 | 6 | 9 | 10 | 10 | 12 | 10 | 10 |
| | 10 | 7 | 7 | 7 | 9 | 10 | 11 | 9 | 13 | 11 |
| | 11 | 8 | 8 | 8 | 10 | 10 | 11 | 10 | 10 | 14 |
| | 12 | 9 | 9 | 9 | 9 | 9 | 9 | 12 | 13 | 13 |
| | 13 | 10 | 10 | 10 | 10 | 10 | 10 | 12 | 13 | 14 |
| | 14 | 11 | 11 | 11 | 11 | 11 | 11 | 13 | 13 | 14 |

FIG.6c
PRIOR ART
LINK USAGE DISTRIBUTION

TO NODE

|   | | 6 | 7 | 8 | 9 | 10 | 11 | 12 | 13 | 14 |
|---|---|---|---|---|---|---|---|---|---|---|
| FROM NODE | 6  | 0  | 10 | 0  | 6 | 0 | 0 | 0 | 0 | 0 |
|           | 7  | 10 | 0  | 10 | 0 | 6 | 0 | 0 | 0 | 0 |
|           | 8  | 0  | 10 | 0  | 0 | 0 | 6 | 0 | 0 | 0 |
|           | 9  | 6  | 0  | 0  | 0 | 6 | 0 | 6 | 0 | 0 |
|           | 10 | 0  | 6  | 0  | 6 | 0 | 6 | 0 | 6 | 0 |
|           | 11 | 0  | 0  | 6  | 0 | 6 | 0 | 0 | 0 | 6 |
|           | 12 | 0  | 0  | 0  | 6 | 0 | 0 | 0 | 2 | 0 |
|           | 13 | 0  | 0  | 0  | 0 | 6 | 0 | 2 | 0 | 2 |
|           | 14 | 0  | 0  | 0  | 0 | 0 | 6 | 0 | 2 | 0 |

FIG.7a
ROUTING MATRIX

|  | \\ | TO NODE | | | | | | | |
|---|---|---|---|---|---|---|---|---|---|
| FROM NODE | | 6 | 7 | 8 | 9 | 10 | 11 | 12 | 13 | 14 |
| | 6 | 6 | 7 | 7 | 9 | 9 | 9 | 9 | 7 | 7 |
| | 7 | 6 | 7 | 8 | 10 | 10 | 8 | 6 | 10 | 8 |
| | 8 | 7 | 7 | 8 | 11 | 11 | 11 | 7 | 7 | 11 |
| | 9 | 6 | 10 | 10 | 9 | 10 | 10 | 12 | 12 | 12 |
| | 10 | 9 | 7 | 11 | 9 | 10 | 11 | 13 | 13 | 13 |
| | 11 | 10 | 8 | 8 | 10 | 10 | 11 | 14 | 14 | 14 |
| | 12 | 9 | 9 | 9 | 9 | 13 | 13 | 12 | 13 | 13 |
| | 13 | 10 | 10 | 10 | 12 | 10 | 14 | 12 | 13 | 14 |
| | 14 | 11 | 11 | 11 | 13 | 13 | 11 | 13 | 13 | 14 |

FIG.7b
LINK USAGE DISTRIBUTION

|  | | TO NODE | | | | | | | | |
|---|---|---|---|---|---|---|---|---|---|---|
| FROM NODE | | 6 | 7 | 8 | 9 | 10 | 11 | 12 | 13 | 14 |
| | 6 | 0 | 6 | 0 | 6 | 0 | 0 | 0 | 0 | 0 |
| | 7 | 6 | 0 | 7 | 0 | 5 | 0 | 0 | 0 | 0 |
| | 8 | 0 | 7 | 0 | 0 | 0 | 7 | 0 | 0 | 0 |
| | 9 | 6 | 0 | 0 | 0 | 6 | 0 | 6 | 0 | 0 |
| | 10 | 0 | 5 | 0 | 6 | 0 | 5 | 0 | 6 | 0 |
| | 11 | 0 | 0 | 7 | 0 | 5 | 0 | 0 | 0 | 6 |
| | 12 | 0 | 0 | 0 | 6 | 0 | 0 | 0 | 6 | 0 |
| | 13 | 0 | 0 | 0 | 0 | 6 | 0 | 6 | 0 | 6 |
| | 14 | 0 | 0 | 0 | 0 | 0 | 6 | 0 | 6 | 0 |

SYSTEM FOR ESTABLISHING ROUTE BY SELECTING MINIMUM OF TIME-INDEPENDENT LINK PARAMETERS OF INCREMENTAL VALUES

This application is a continuation of application Ser. No. 07/136,369, filed Dec. 22, 1987, now abandoned.

BACKGROUND OF THE INVENTION

The present invention relates to a centralized network management and control in a dedicated communications system, and more particularly to the generation of a routing matrix for a centralized network controller.

In a communications network, two routing algorithms are available for determining a route between source and destination. The first is a centralized routing algorithm in which the routing functions of the whole network are concentrated in a single point and the second is one in which routing functions are distributed throughout the network nodes. Each of the routing algorithms is divided into dynamic routing in which the algorithm has a time-dependent variable nature and fixed routing in which the alogrithm is time-independent.

The present invention relates to the centralized, fixed routing alogrithm. As described in Data and Computer Communications, Macmillan Publishing Company, New York and Collier Macmillan Publishers, London by William Stallings, pages 258 to 259, fixed routing is one of the simplest routing strategies in which a route is selected for each source-destination pair of nodes in the network. The routes are fixed, or at least only change when there is a change in the topology of the network. A central routing directory is created to be stored at a network control center.

Figure 6A:
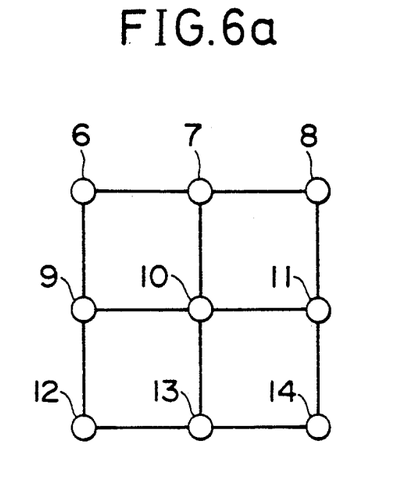
FIG. 6a is a schematic illustration of a network topology.
Figure 6B:
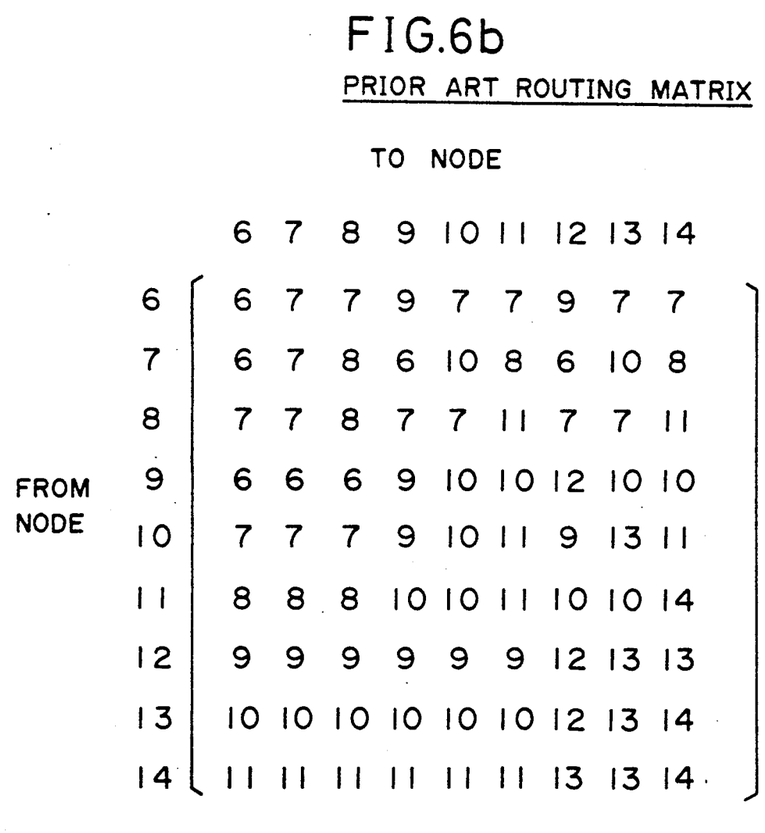
FIGS. 6b and 6c are illustrations of a routing matrix and a link usage distribution matrix respectively which are derived from the topology of FIG. 6a according to the prior art routing algorithm.
Figure 6C:
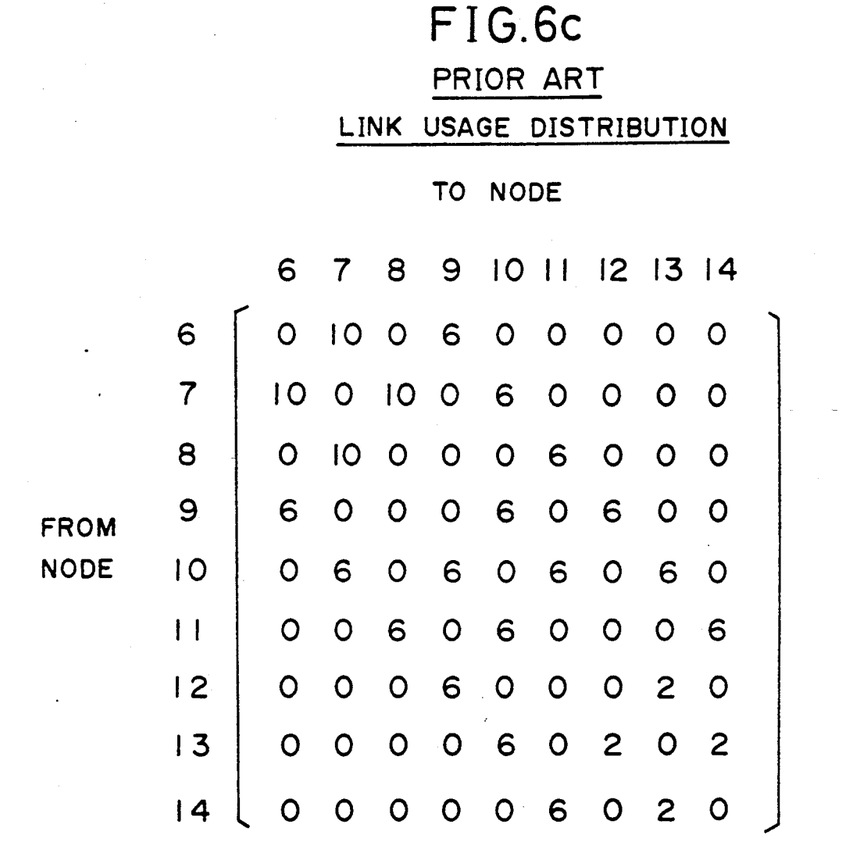

To achieve efficient utilization of network resources, it is important that any destination be reached from any source by a mininum number of links, or "hops", and a method of doing this is described in Computer Networks, Prentice-Hall, Inc., by Andrew S. Tanenbaum, pages 38 to 40. According to this method, a route is determined on a link-by-link basis. One disadvantage of this method is that if the number of nodes increases, the process steps involved increase in a geometrical progression. In addition, if alternative routes are available for a given pair of nodes, there is no appropriate yardstick available to evaluate the alternatives to determine the optimum route. In such instances, the usual practice is to employ a method by which the route of first encounter is selected or a method by which one of the alternative routes is randomly selected. If this prior art routing is applied to a network of FIG. 6a, a routing directory of FIG. 6b will be derived and link usages will be unevenly distributed as shown in FIG. 6c, resulting in inefficient utilization of network resources and increased lost calls.

SUMMARY OF THE INVENTION

It is therefore an object of the present invention to provide a routing algorithm which allows efficient utilization of network resources by uniformly distributing link usages and a network controller using the routing alogrithm for controlling a communications network.

According to a first aspect of the present invention, there is provided a method for deriving a routing matrix for a communications network having a plurality of nodes interconnected by links each having a link parameter. According to the method a second node which can be reached from a first node by a single hop is determined, and a third node which can be reached from the second node by $(m-1)$ hops is determined, where m is an integer equal to or greater than unity. A route between the first and third nodes via the second node is selected if it is the only route available between the first and second nodes. A route which minimizes a total of link parameters between the first and third nodes is selected if two or more routes are available between the first and third nodes. The identification of the second node of the selected route is stored in a location addressible as a function of the identifications of the first and third nodes. The above steps are repeated by shifting the first node to the next and incrementing the value m by one.

According to a second aspect, the present invention provides a network controller for a communications system having a plurality of nodes interconnected by links, each of the links having a link parameter. The network controller includes a memory in which the routing matrix of the invention is stored and means responsive to address information from each of the nodes for reading one of the node identifications from the memory to determine a route between source and destination nodes and controlling nodes involved in the determined route to establish a connection between the source and destination nodes.

BRIEF DESCRIPTION OF THE DRAWINGS

The present invention will be described with reference to the accompanying drawings, in which.

DETAILED DESCRIPTION

Figure 1:
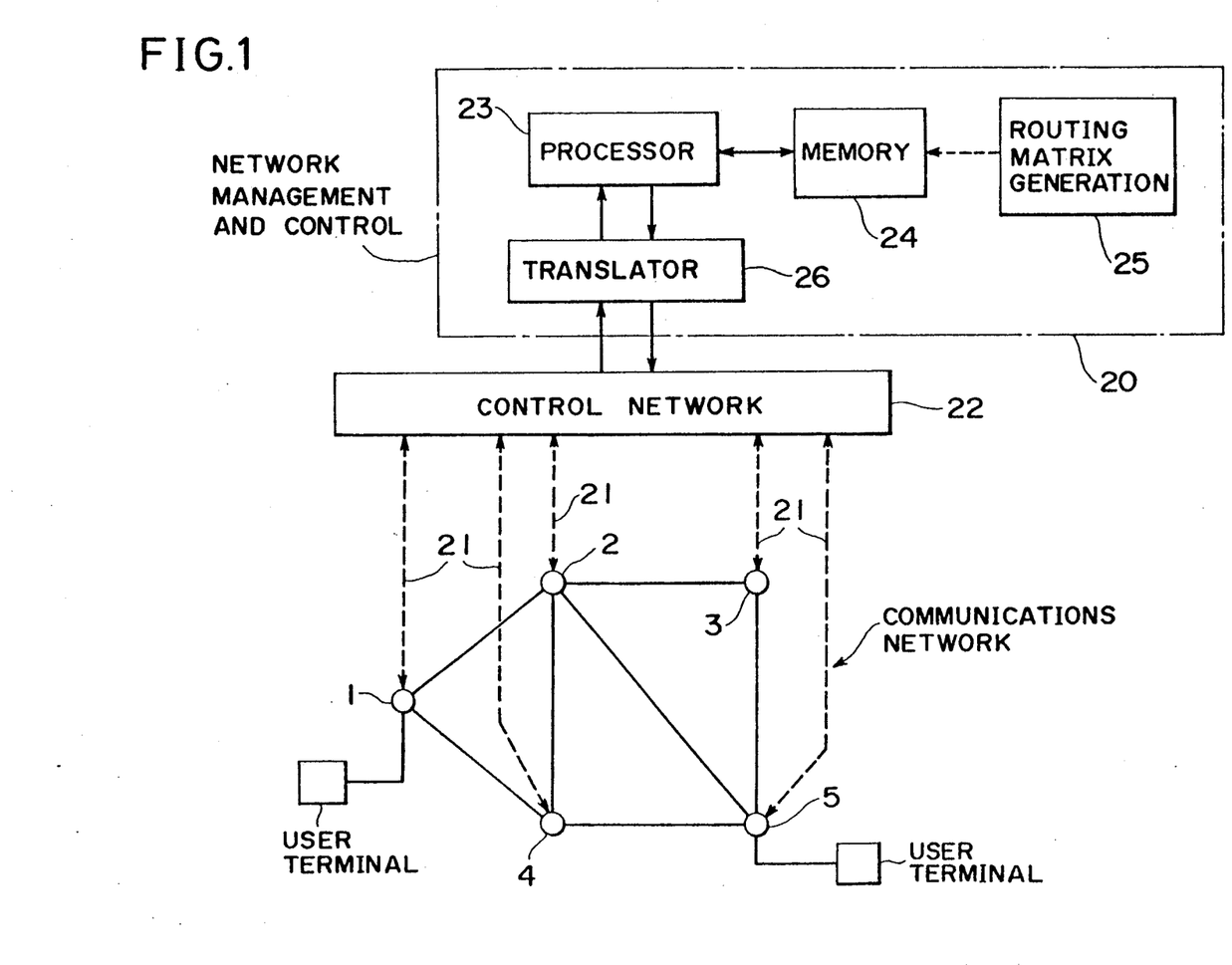
FIG. 1 is a schematic block diagram of a communications system embodying the present invention.

Referring now to FIG. 1, there is shown a dedicated communications system for serving user terminals through a network of switching nodes 1 through 5 which are interconnected by direct and alternate transmission links. Each of the transmission links has a "link weight" or parameter which is determined as a function of the traffic volume it carries. Each node is also known as a network element and is constructed of a known digital cross-connect system. All the nodes 1 through 5 are under control of a centralized, network management and control system 20 via two-way control links indicated by dotted lines 21.

Control links 21 are terminated at a control network 22 which is associated with a central processor 23 through a translator 26. Central processor 23 accesses a memory, or routing directory 24 in response to receipt of address information from a source node to read node identifications which are stored in locations addressable as a function of source and destination addresses. The routing matrix is stored in the memory 24 as one of many applications software which are utilized by all the terminal users of the dedicated network and is generated by a routing matrix generation processor 25 which will be described in detail below. Using source and destination node addresses contained in the address information supplied from a given source node, central processor 23 reads a route to the destination from the memory 24 and supplies the routing information to a translator 22 where it is converted to a set of switching signals. The switching signals are sent over associated control links to nodes along the selected route to establish a connection between source and destination.

Figure 2A:
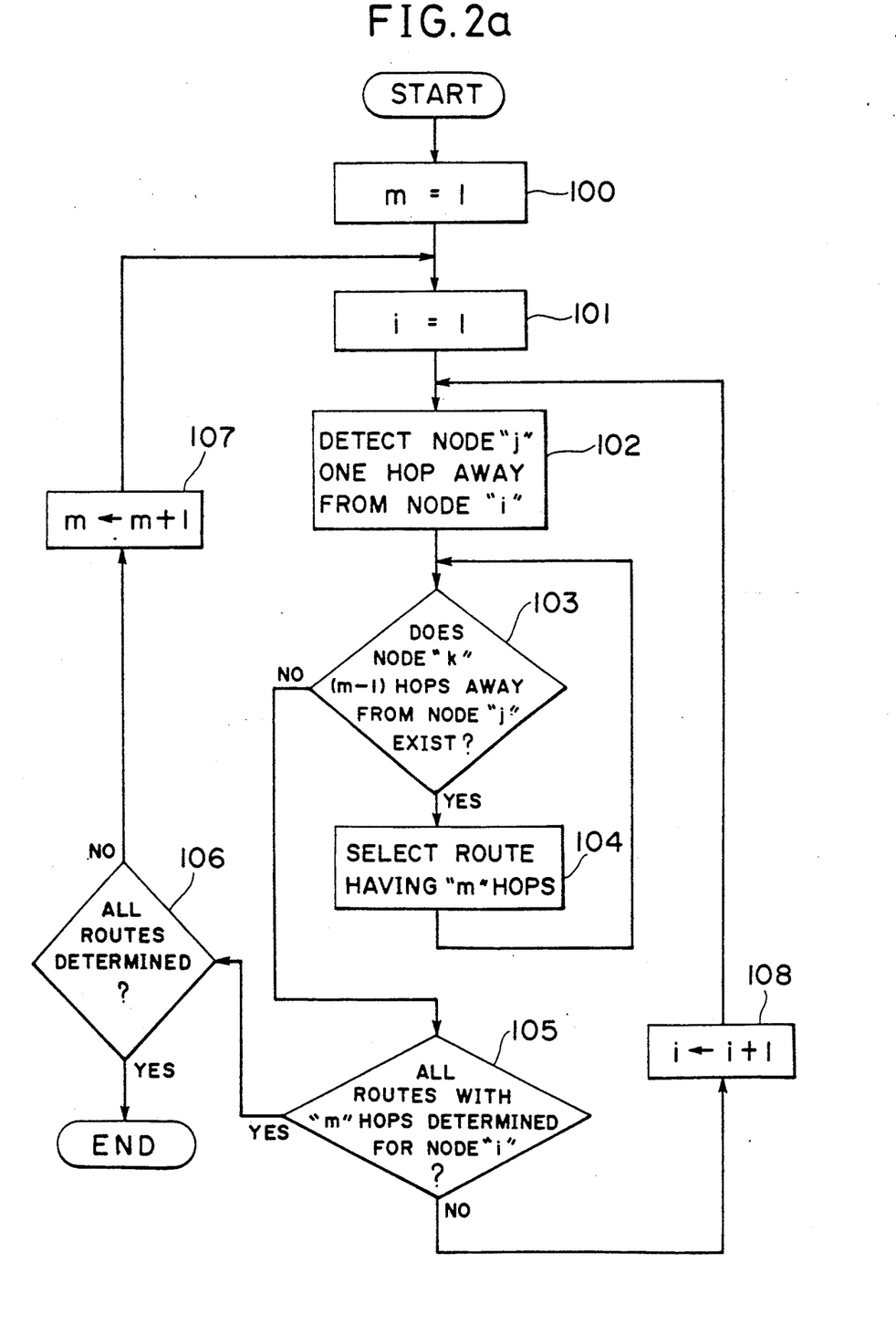
FIGS. 2a and 2b are flow diagrams for deriving a routing matrix to be stored in the memory of FIG. 1.

The generation of the routing matrix will now be described with reference to FIGS. 2a and 2b. The operation of the routing algorithm of the invention from which the routing matrix is derived will be given later with reference to FIGS. 3 to 7. In FIG. 2a, a routing matrix generation program starts with operations block 100 which directs the setting of a "hop number" variable "m" to 1. Exit then is to operations block 101 which directs the setting of a "node number" variable "i" to 1. Block 101 is followed by operations block 102 which directs a search for one or more nodes "j" located one hop from node "i". Exit then is to decision block 103 which tests for the presence of a node "k" located (m−1) hops from each of the nodes identified by the variable "j". If the answer is affirmative, control proceeds to operations block 104 which directs the selecting of a route having "m" hops.

Figure 2B:
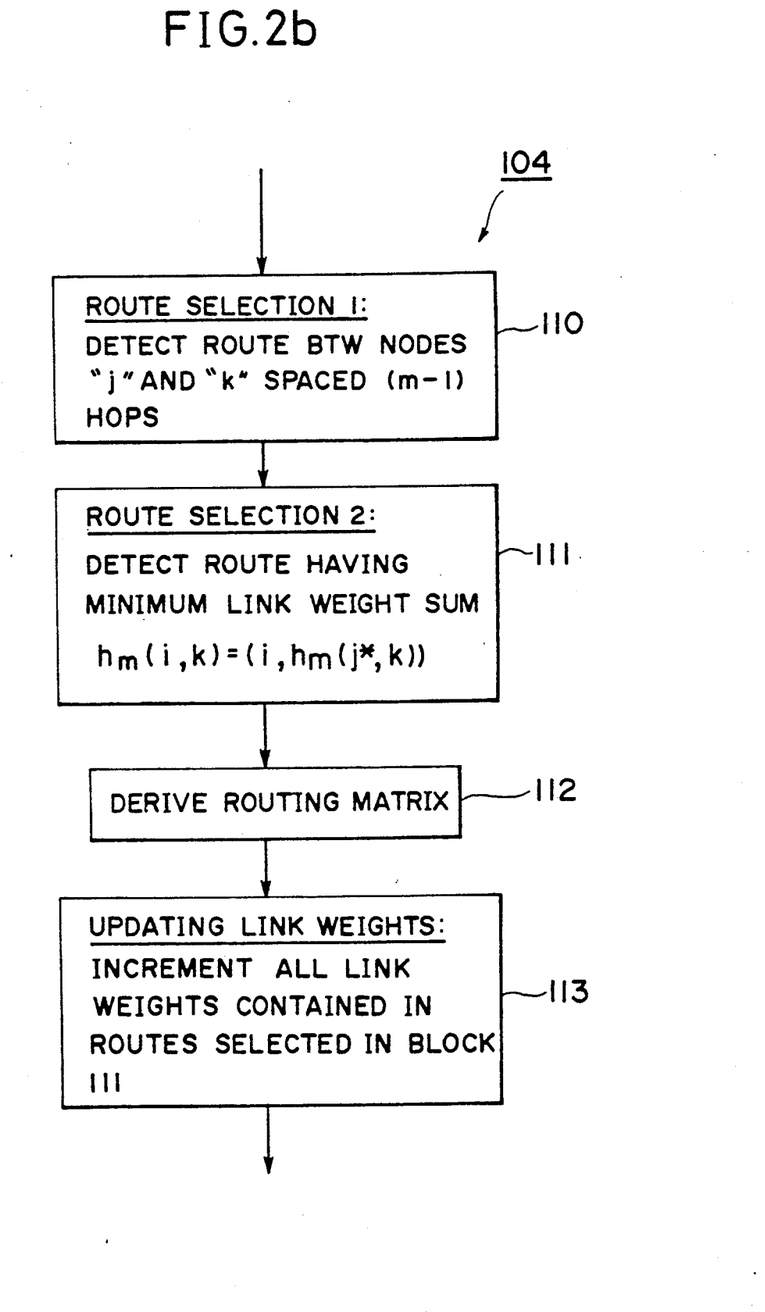

Details of operations block 104 are shown in FIG. 2b. A route determination and matrix generation subroutine commences with operations block 110 which directs the detecting of routes from all the nodes "j" to nodes "k" located (m−1) hops from the former as stated in block 103. Control now exits to operations block 111 which directs the determining of which one of the selected routes gives a minimum sum of link parameters, or link weights and the identifying of the determined route as $h_m(i,k)$ which is also given by:

$$h_m(i,k) = (i, h_{m-1}(j^*, k)) \ldots \quad (1)$$

where j* represents the node "j" interposed in the determined least-parameter route between nodes "i" and "k". Exit then is to operations block 112 which directs the generating of a route matrix and then to operations block 113 which directs the updating of a link parameter matrix by incrementing the link weights of all the links involved in the minimum-sum route.

Control now exits the route determination and matrix generation subroutine 104 and returns to decision block 103 to detect another node "k" located (m−1) hops from the node "i" via node "j" and enters block 104 to further increment the link weights. Blocks 103 and 104 are repeated until all nodes "k" are detected and the link weights of all the routes between a given node "i" and nodes "k" are incremented. If the route determination and matrix generation subroutine is performed with respect to all possible nodes "k", exit from decision block 103 is to decision block 105 which tests to see if the route determination and matrix generation subroutine has been performed for all routes with "m" hops with respect to all possible nodes "i". If the answer is negative, exit is to operations block 108 which directs the incrementing of the node number variable "i" by 1. Control now returns to operations block 102 to repeatedly execute the route determination and matrix generation subroutine with respect to the remaining nodes "i".

Upon completion of the subroutine with respect to all possible nodes "i" for all routes with "m" hops, control exits decision block 105 and enters decision block 106 which checks to see if the subroutine has been performed with respect to all possible source-destination pairs of nodes. If the answer is negative, exit is to operations block 107 which directs the incrementing of the hop number variable "m" by 1, with control returning to operations block 101 to repeat the process described above. When the maximum number of hops of the network is reached, control exits block 106 to terminate the routing matrix generation program.

Figure 3A:
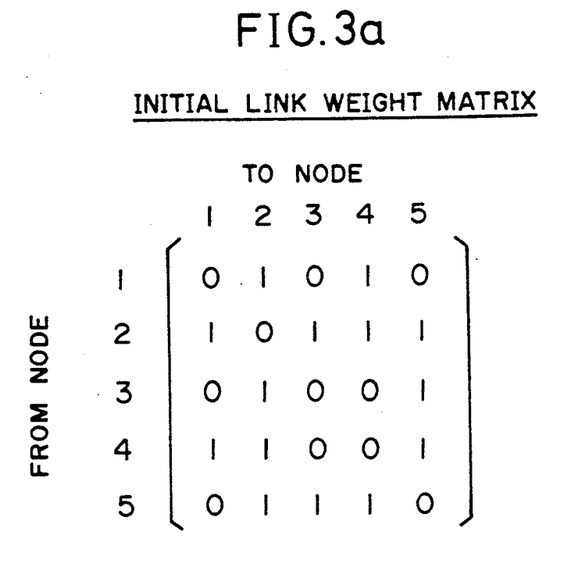
FIGS. 3a, 3b and 3c are illustrations of a process of deriving a link parameter matrix.

The operation of the routing algorithm of the present invention will be understood with the following description. The link parameter matrix will first be described with reference to FIGS. 3a to 3c. Initially, the route determination and matrix generation subroutine has not been performed and so the communications network of FIG. 1 has a link parameter matrix as shown in FIG. 3a. Numeral "1" at the row-column intersection indicates the presence of a link between corresponding nodes and numeral "0" indicates the absence of any link between them. For m=1, let one of nodes "j" which is located one hop from (adjacent to) a given node "i" be denoted as node "p". Since the node which can be reached by (m−1) hops from the node "p" is the own node "p", the node which is located one hop from the given node "i" is the node "p", and the route between them is given as:

$$h_1(i,p) = (i,p) \ldots \quad (2)$$

Figure 3B:
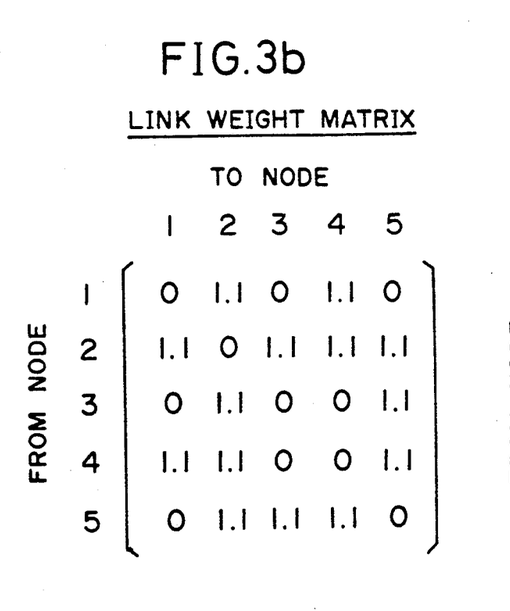
Figure 4A:
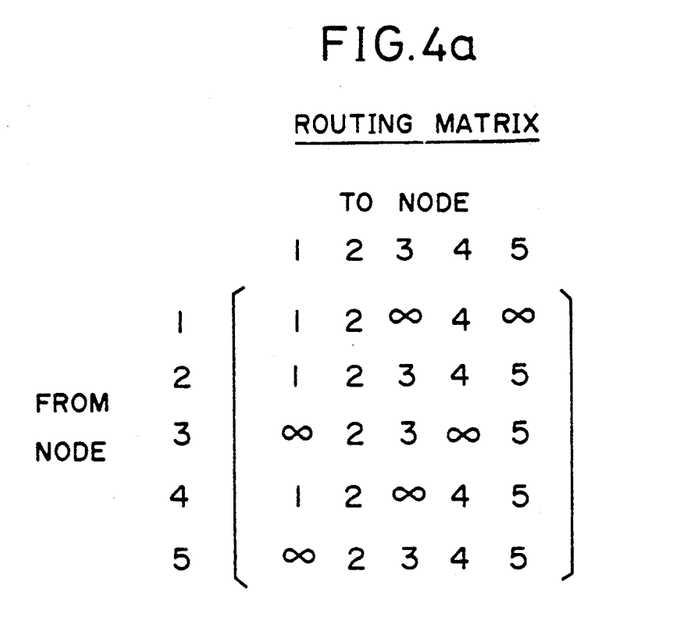
FIGS. 4a and 4b are illustrations of a process of deriving a routing matrix.

Therefore, in the case of m=1, the route between nodes "i" and "p" is uniquely determined by the route determination block 111. Thus, in the routing matrix generation block 112, a matrix element "p" is inserted to the crosspoint between the i-th row and the p-th column and a matrix element "i" is inserted to the crosspoint between the p-th row and the i-th column. Upon completion of the route determination and matrix generation subroutine 104, the routing matrix will appear as shown in FIG. 4a, where the symbol ∞ indicates that no routes can be established between nodes when m=1. In the subsequent link parameter matrix generation block 113, a predetermined amount of incremental value, typically 0.1 is added to the matrix elements "1" in the link parameter matrix so that it appears as shown in FIG. 3b.

Figure 3C:
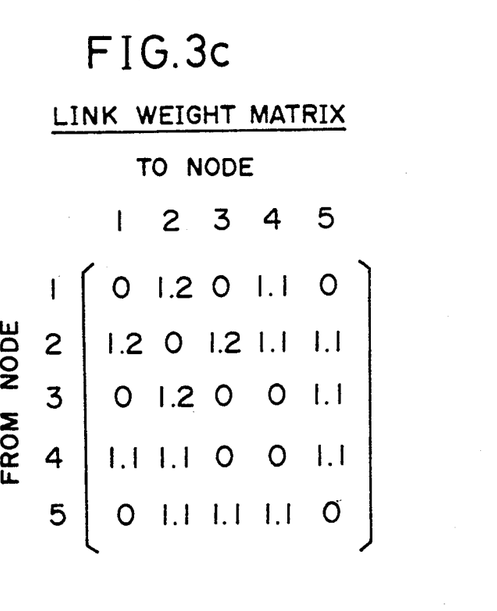
Figure 4B:
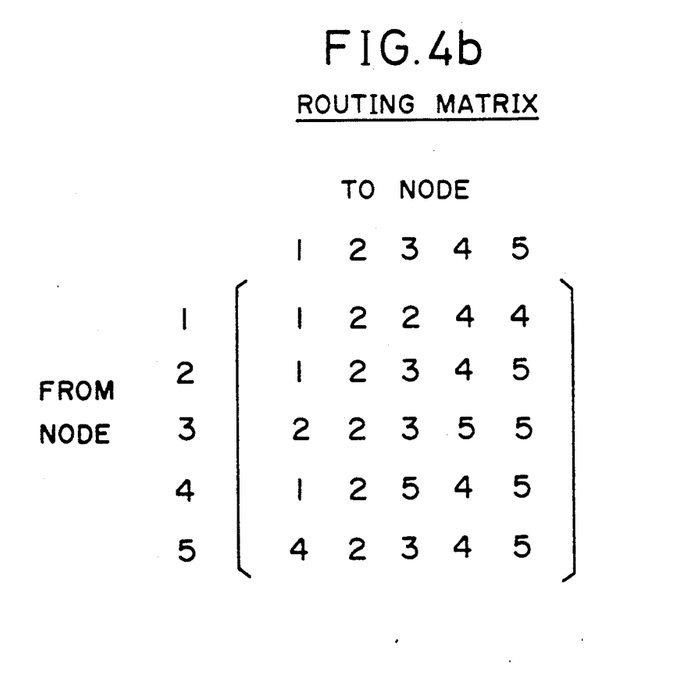

When the hop number variable "m" becomes equal to 2 or greater, all the nodes that can be reached from the node "p" by (m−1) hops and the routes thereto have already been determined by the subroutine 104 and therefore when a route is to be determined for "m" hops, the route for (m−1) hops have already been determined. More specifically, in the exemplary network of FIG. 1, if node 3 is to be reached by two hops from node 1, the route by way of node 2 is the only route available and the weighting factor of the link between nodes 1 and 2 and that of the link between nodes 2 and 3 are incremented by 0.1 as shown in FIG. 3c. If node 5 is to be reached from node 1 by two hops, two alternate routes are available. The first is by way of node 2 and the second is by way of node 4. At this point the minimum sum rule of the route determination block 111 applies. According to this rule, the first available route has a total of weights equal to 2.3 as is seen from FIG. 3c and the second route has a total of 2.2. Thus, the second route is selected in the route determination block 111. When control subsequently enters the routing matrix generation block 112, a matrix element "j*" is inserted to the crosspoint between the i-th row and the k-th column of the routing matrix for a route from node "k" to node "i" and the element value of the crosspoint between the k-th row and the j*-th column of the matrix is inserted to the crosspoint between the k-th row and the i-th column for a route from node "k" to node "i" since that value has already been determined when node "j*" is reached by (m−1) hops (see Equation 1). More specifically, when the route by way of node 4 is taken from node 1 to node 5 as mentioned earlier, a matrix element 4 is inserted to the crosspoint between the first row and fifth column of the routing matrix as shown in FIG. 4b and the matrix element, namely, "4" at the crosspoint between the fifth row and fourth column is inserted to the crosspoint between the fifth row and first column. When all route selection processes are complete for m=2, a routing matrix of the network of FIG. 1 is finally derived as shown in FIG. 4b. The routing matrix so obtained is stored in the routing directory 24 and corresponding route data is read out of the memory in response to source-destination address information supplied from the processor 23.

From the foregoing description it is apparent that a route is determined between any source and destination by a minimum number of hops since the number of hops is stepwisely incremented in the process of the route determination.

Figure 5A:
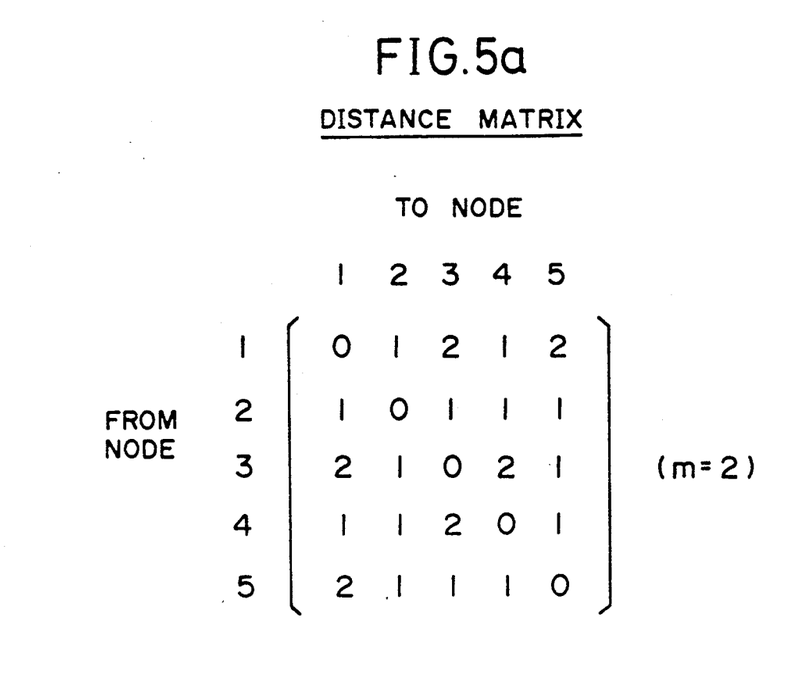
FIGS. 5a and 5b are illustrations of a process of deriving a distance matrix.
Figure 5B:
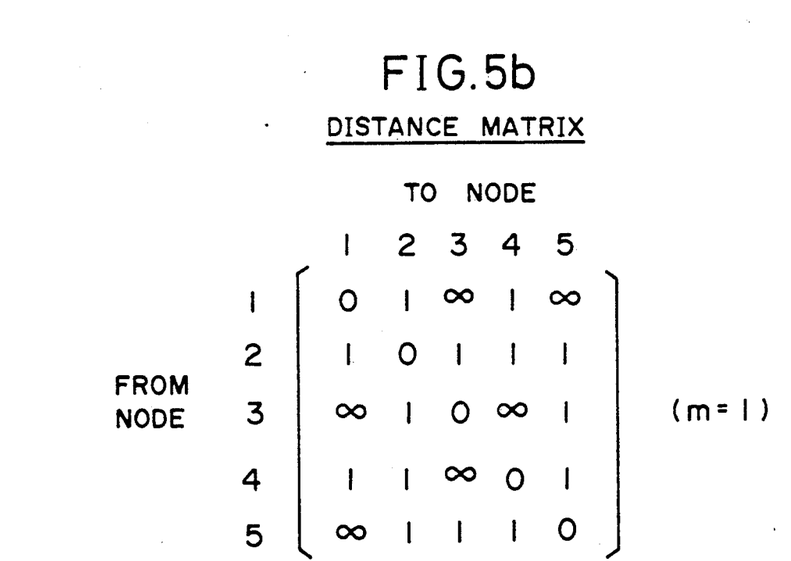

In an alternative embodiment, the decision block 103 is modified to efficiently detect the presence of a node "k" reached from node "i" by (m−1) hops by deriving a "distance" matrix from the number of hops taken to reach the destination by storing hop counts at crosspoints of node pairs. One example of such a distance matrix is obtained for m=2 from the network of FIG. 1 and is shown in FIG. 5a. FIG. 5b shows an initial distance matrix which is created when m=1. The symbol ∞ of FIG. 5b indicates that the number of hops between nodes is yet to be determined.

In a further modified embodiment, the link parameter derivation block 113 can be modified to reflect the traffic carrying capacity of each link in the amount of the incremental value. Specifically, the incremental value is rendered variable as an inverse function of the traffic carrying capacity of the link of interest.

Figure 7A:
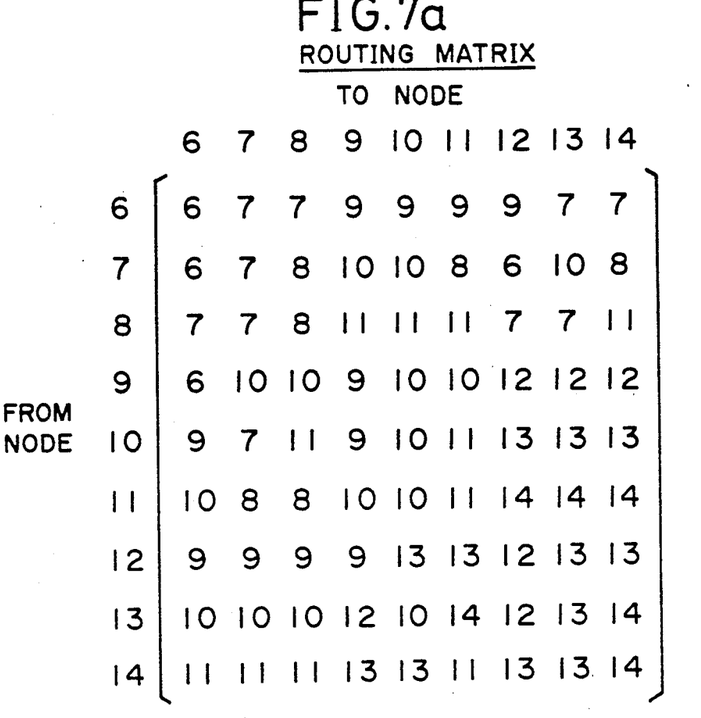
FIGS. 7a and 7b are illustrations of a routing matrix and a link usage distribution matrix respectively which are derived from the topology of FIG. 6a according to the routing algorithm of the present invention.
Figure 7B:
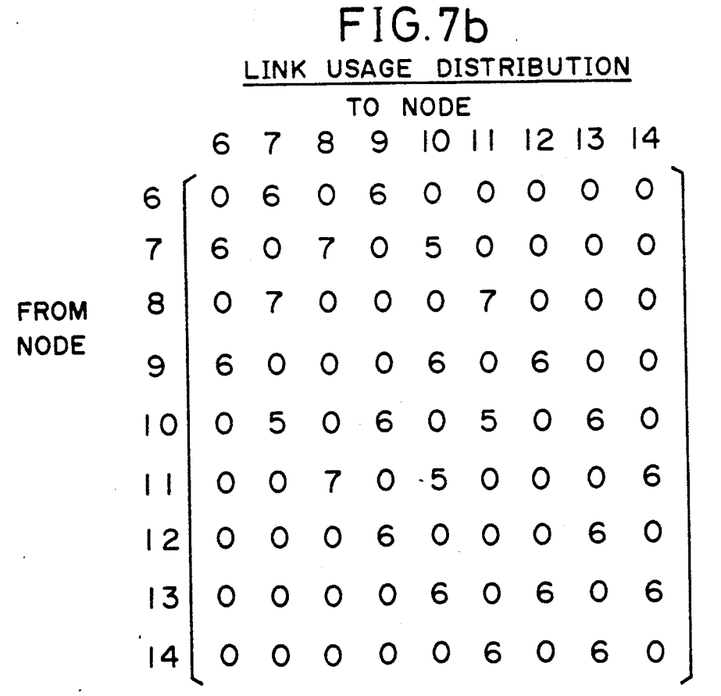

The advantageous effect of the present invention will be visualized as follows. FIG. 7a is the routing matrix of the present invention derived from the communications network of FIG. 6a and FIG. 7b shows a computer simulation of the distribution of link usages according to the present invention. It is seen from FIG. 7b that the maximum number of link usages decreases from 10 to 7 and link usages distribute more evenly over the network than it is with the prior art routing matrix.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. In a communication network of multiple nodes interconnected by links, a method for establishing a route between a source node and a destination node via an intermediate node, said nodes having respective identifications and each of said links having a link parameter of time-independent value, comprising the steps of:
   a) determining a second node as corresponding to said intermediate node which is reached from a first node by a single hop, said first node corresponding to said source node;
   b) determining a third node as corresponding to said destination node which is reached from said second node by (m−1) hops, where m is an integer equal to or greater than unity;
   c) selecting links on a route between said first and third nodes via said second node if, said route of the selected links is the only route available between said first and third nodes;
   d) if said route of the selected links is not the only route available between said first and third nodes, storing initial values of the link parameters of possible routes between said first and third nodes in matrix locations of a link parameter memory, said link parameters representing an amount of traffic carried by a link;
   e) incrementing said initial values of said selected links by a predetermined amount to update said link parameter memory;
   (f) summing said link parameters of said possible routes;
   g) selecting links on one of said possible routes which give a minimum sum of the link parameters;
   h) storing an identification of a second node of the links selected according to step (c) or (g) in a routing memory addressable as a function of identifications of said first and third nodes;
   i) repeating steps (a) to (h) by shifting a first node to the next and incrementing the value m by one to thereby store a plurality of identifications of said second node in said routing memory; and
   j) recalling one of said stored identifications from said routing memory as a function of identifications of said source and destination nodes and establishing a route between said source node and said destination nodes through an intermediate node having said recalled identification.

2. A communications system having a plurality of nodes interconnected by links each having a link parameter of time-independent value, comprising:
   a routing matrix memory storing an array of node identifications in locations addressable as a function of address information supplied thereto; and
   means for recalling one of said node identifications from said routing matrix memory as a function of identifications of a source node and a destination node and establishing a route therebetween through an intermediate node having said recalled node identification,
   said array of node identifications being stored in said routing matrix memory by a process including the steps of:
   a) determining a second node as corresponding to said intermediate node which is reached from a first node by a single hop, said first node corresponding to said source node;
   b) a determining a third node as corresponding to said destination node which is reached from said second node by (m−1) hops, where m is an integer equal to or greater than unity;

c) selecting links on a route between said first and third nodes via said second node if said route of said selected links is the only route available between said first and third nodes;

d) if said route of said selected links is not the only route available between said first and third nodes, storing initial values of the link parameters in locations of a link parameter matrix memory, said link parameters representing an amount of traffic carried by a link;

e) incrementing said initial values of said selected links by a predetermined amount to update said link parameter matrix memory;

f) summing link parameters of possible routes;

g) selecting links on one of said possible routes which give a minimum sum of the link parameters;

h) storing an identification of a second node of the links selected according to step (c) or (g) in a location of said routing matrix memory addressable as a function of identifications of said first and third nodes; and i) repeating steps (a) to (h) by shifting a first node to the next and incrementing the value m by one.

3. A method for establishing a route between a source node and a destination node via an intermediate node in a communications network, said nodes having respective identifications and being interconnected by links each having a link parameter of time-independent value, comprising the steps of:

a) determining an intermediate node which is reached from a source node by a single hop;

b) determining a destination node which is reached from said intermediate node by (m−1) hops, where m is an integer equal to or greater than unity;

c) selecting links on a route between said source node and said destination node via said intermediate node if said route is the only route available between said source node and said destination node;

d) if said route of said selected links is not the only route available between said source and destination nodes, setting initial values of the link parameters of possible routes between said source node and said destination node, said link parameters representing an amount of traffic carried by a link;

e) incrementing said initial values of said selected links by a predetermined amount;

f) summing said link parameters of said possible routes;

g) selecting links on one of said possible routes which give a minimum sum of the link parameters; and h) establishing a route between said source node and said destination node via an intermediate node via the links selected by step (c) or (g).

* * * * *